യunited States Patent Office 3,824,213
Patented July 16, 1974

3,824,213
ACID-INTERCHANGE REACTION FOR FORMING HALOGENATED AROMATIC POLYESTERS
Robert W. Stackman, Morristown, N.J., assignor to Celanese Corporation, New York, N.Y.
No Drawing. Filed Apr. 16, 1973, Ser. No. 351,206
Int. Cl. C08g 17/003
U.S. Cl. 260—47 C
15 Claims

ABSTRACT OF THE DISCLOSURE

An acid interchange reaction adapted to form halogenated aromatic polyesters is disclosed. An aliphatic carboxylic acid ester of a bisphenol of the structural formula:

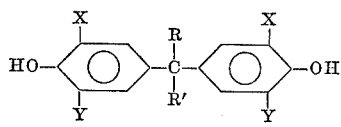

wherein X is chlorine or bromine, Y is hydrogen, chlorine or bromine with the provision that when X is chlorine, Y is hydrogen or chlorine and when X is bromine, Y is hydrogen or bromine, R and R' be the same or different and represent lower alkyl groups or hydrogen or may, together, constitute a cyclic hydrocarbon group; is reacted at a temperature of about 220° C. to about 350° C. with an aromatic acid mixture of from about 10 to about 60 percent of the mixture of terephthalic acid and, correspondingly, from about 90 to about 40 percent of the mixture of isophthalic acid in a common solvent for the reactants to form the polyester. The reaction is performed in the presence of a catalytically effective amount of a cobalt, nickel or manganese salt of an aliphatic carboxylic acid.

BACKGROUND OF THE INVENTION

Halogenated aromatic polyesters derived from a halogenated bisphenol and an aromatic dicarboxylic acid have good heat and light stability properties. These halogenated aromatic polyesters have generally been formed in a one-step reaction in which the halogenated bisphenol, aromatic diacid halide (the latter usually necessary since the acid normally does not react) and catalyst are reacted by interfacial or solution polymerization techniques. See, for example, U.S. Pat. 3,234,167. Such procedures, however, are disadvantageous since the aromatic diacid halide is a relatively expensive reactant.

The search has continued for a process for forming a halogenated aromatic polyester utilizing the relatively inexpensive aromatic dicarboxylic acids as reactants.

It is also known (as shown, for example, in U.S. Pat. 2,595,343) to first react an aromatic bisphenol with acetic anhydride to form the bisphenol diacetate and then condense the bisphenol diacetate with an aliphatic carboxylic acid to thus form a polyester by an acid interchange reaction. The condensation reaction is performed in the presence of an acid catalyst such as para-toluenesulfonic acid, phosphoric acid or sulfuric acid. Unfortunately such an acid interchange reaction does not yield acceptable products when an aromatic dicarboxylic acid is substituted as a reactant for the aliphatic acid. In particular, it has been found that when the acid interchange reaction of the type disclosed in the aforesaid U.S. Pat. 2,595,343, is conducted with halogenated aromatic bisphenol diacetate and aromatic dicarboxylic acid reactants, the products are often discolored and of low (i.e., below about 0.2) inherent viscosity (I. V., measured at 25° C. in a solution of 50-50 [by weight] mixture of phenol and tetrachloroethane).

The search has thus continued for a suitable process for the production of a halogenated fully aromatic polyester which process is relatively inexpensive and which produces commercially acceptable, light-colored polyesters suitable for forming into shaped articles such as fibers, filaments, films and the like, by solvent-forming techniques. As understood by those skilled in the art, suitable fully aromatic polyesters must have an inherent viscosity of at least about 0.2 for such forming processes.

It is an object of this invention to provide an improved process for the production of a halogenated aromatic polyester.

It is also an object of this invention to provide a process for the production of a halogenated aromatic polyester which utilizes relatively inexpensive reactants as compared to the prior art techniques now known and used.

It is also an object of this invention to provide a process for the production of halogenated aromatic polyesters utilizing an aromatic dicarboxylic acid as a reactant.

It is still another object of this invention to provide a process for the production of halogenated aromatic polyesters which polyesters have a sufficient inherent viscosity to allow formation of shaped articles of the polyesters by conventional techniques such as solvent-forming.

It is further an object of this invention to provide an improved process for the production of halogenated aromatic polyesters having improved color properties as compared to the prior art products.

SUMMARY OF THE INVENTION

These and other objects of the invention are provided by a process for producing a halogenated aromatic polyester which comprises reacting in solution (a) an aliphatic carboxylic acid ester of a bisphenol having the recurring structural formula:

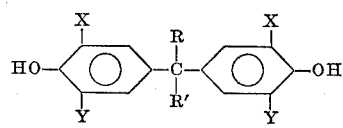

wherein X is chlorine or bromine and Y is hydrogen, chlorine or bromine, with the provision that when X is chlorine, Y is hydrogen or chlorine and when X is bromine, Y is hydrogen or bromine, R and R' may be the same or different and represent lower alkyl groups or may, together, constitute a cyclic hydrocarbon group with (b) an aromatic acid mixture of terephthalic and isophthalic acids wherein from about 10 to about 60 percent of the mixture is terephthalic acid and correspondingly from about 90 to about 40 percent of the mixture is isophthalic acid at a temperature of from about 220° C. to about 350° C. in the presence of a catalytically effective amount of a cobalt, nickel or manganese salt of an aliphatic carboxylic acid to yield the desired halogenated aromatic polyester.

DETAILED DESCRIPTION OF THE PREFERRED EMBODIMENTS

The carboxylic acid ester of the above-defined bisphenol may be formed in any suitable manner.

For example, a bisphenol having the structural formula:

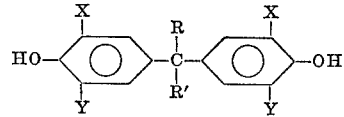

wherein X is chlorine or bromine, Y is hydrogen, chlorine or bromine with the provision that when X is chlorine, Y is hydrogen or chlorine and when X is bromine, Y is hydrogen or bromine and R and R' are the same or different and represent lower alkyl groups (i.e., having 1 to 6, preferably 1 to 3, carbon atoms) or hydrogen or may together constitute a cyclic hydrocarbon group; may advantageously be reacted with an aliphatic monocarboxylic acid halide or acid anhyldride in the presence of an esterification catalyst and the presence or absence of a suitable solvent.

Suitable acids whose acid halides or acid anhydrides are esterifying reactants contain from 2 up to about 5 carbon atoms and include acetic, propionic, butyric and caleric acids. Acetic anhydride is the preferred esterifying reactant.

The suitable bisphenols include 4,4'-isopropylidene bis(2,6-dibromophenol);
4,4'-isopropylidene bis(2,6-dichlorophenol);
4,4'-isopropylidene bis(2-chlorophenol);
4,4'-isopropylidene bis(2-bromophenol); and
1,1'-bis(4-hydroxy-2,6-dichlorophenol)-cyclohexane.

4,4'-isopropylidene bis(2,6-dichlorophenol), commonly known as "tetrachlorobisphenol A" is the preferred bisphenol.

The esterification reaction is generally conducted with the reactants present in amounts sufficient to fully esterify the bisphenol and thus form a diester. Generally, esterification is conducted with the reactants present in molar amounts of from about 1:2 to about 1:10, preferably from about 1:2 to 1:3, bisphenol to aliphatic carboxylic acid halide or acid anhydride. A temperature of from about 10° C. to about 150° C., preferably from about 20° C. to about 100° C., is normally employed. Any suitable esterification catalyst such as sulfuric acid, sodium acetate, or the like may be used and is typically present in a catalytically effective amount (which amount can be, for example, from about 0.001 to about 1, preferably from about 0.01 to 0.1, percent by weight of the bisphenol). The reaction time is that which is sufficient to form the diester of the starting bisphenol, generally from about 0.1 to about 5 hours. If desired, the esterification reaction may be conducted in any suitable solvent for the reactants which does not interfer with the esterification reaction (e.g., does not react with the bisphenol or acid components). The solvent may be a hydrocarbon, halogenated aliphatic or aromatic hydrocarbon or the like (i.e. is inert under the reaction conditions employed) and includes particularly solvents such as diphenyl ether, benzophenone, dichloroethane and dichlorobenzene.

The resulting diester is dissolved in a solvent having a boiling point above about 260° C., which solvent does not deleteriously interfere with the subsequent acid interchange reaction, and reacted in solution with a mixture of terephthalic and isophthalic acids to form a polyester having a molecular weight of about 10,000 up to about 200,000. Suitable solvents which will dissolve both the diester and acid mixture reactants include, for example, diphenyl ether, halogenated diphenyl ether, diphenyl sulfone, benzophenone or the like (i.e. are inert under the reaction conditions employed).

The terephthalic/isophthalic acid mixture generally contains from about 10 up to about 60, preferably from about 20 to about 40, terephthalic acid and correspondingly from about 90 to about 40, preferably from about 80 to about 60, percent isophthalic acid. It has been found that the use of terephthalic acid or isophthalic acid alone or in mixtures other than defined herein, are unsuitable for use in the process of the present invention. The unsuitable acids and mixtures tend to come out of solution and conversion and yield of acceptable polyesters are relatively low.

Reaction of the diester and the terephthalic/isophthalic acid mixture may be performed with these reactants present in substantially stoichiometric amounts, that is, in molar amounts of from about 0.8:1 to about 1.2:1, preferably from about 0.9:1 to about 1.1:1, diester to terephthalic/isophthalic acid mixture.

The acid interchange reaction may be performed at a temperature of from about 220° C. to about 350° C., preferably from about 240° C. to about 320° C., in the presence of a catalytically effective amount of a cobalt, nickel or manganese salt of an aliphatic monocarboxylic acid. The reaction is generally conducted in an inert atmosphere (such as argon or nitrogen) at subtantially atmospheric or slightly higher (say up to about 20 p.s.i.g.) pressure, however, higher or lower pressures may be used if so desired.

The reaction is conducted for a time sufficient to provide a resulting halogenated aromatic polyester having an inherent viscosity (I.V.) measured in a solution of a 50-50 (by weight) mixture of phenol and tetrachloroethane of at least about 0.2, which time is often in the range of from about 2½ to 48 hours. Often, the reaction may be started at the lower portion of the temperature range (e.g., from about 220° C. to about the boiling point of the solvent) for a time of from about ½ to about 2 hours. The temperature of the reaction mixture may then be raised to a temperature of up to about 10° C. above the boiling point of the reaction mixture solvent, but not more than to about 350° C., to slowly distill off the solvent and aliphatic acid byproduct formed during the reaction, thereby leaving the halogenated aromatic polyester as a solid residual product. The reaction mixture may be maintained at this latter temperature for a time of from about 2 to about 46 hours.

The aliphatic monocarboxylic acid whose cobalt, nickel or manganese salt is the polymerization catalyst may contain up to about 4 carbon atoms. Suitable acids thus include formic, acetic, propionic, butyric and isobutyric. The preferred catalysts are nickel, cobalt and manganese acetates. The catalyst may be present in amounts of from about 0.0001 to about 2, preferably from about 0.001 to 0.1, percent by weight of the total of the bisphenol diester and aromatic acid mixture starting reactants. Mixtures of the catalyst may be used if so desired.

Generally, the acid interchange reaction is conducted in a batch-type manner, however, any other suitable manner known to those skilled in the art may be employed if so desired.

Although the bisphenol diester is the preferred starting material for the polymerization (i.e., acid interchange) reaction, it will be understood by those skilled in the art that a partial ester of the bisphenol may also be utilized so long as the polymerization reaction mixture contains a sufficient amount of acid halide or acid anhydride esterifying reactant to convert the partial ester to the diester. Also, while the present process has been described in terms of a first esterification reaction and a second, acid interchange polymerization reaction, it will be understood by those skilled in the art that the bisphenol starting material and esterifying reactant may be dissolved in an acid interchange reaction solvent with the terephthalic/isophthalic acids mixture and nickel, cobalt and/or manganese aliphatic carboxylic acid salt catalyst, and the materials reacted in a single reaction zone under the conditions described above for the acid interchange reaction to form the halogenated aromatic polyester product. While a single reaction method would not require a separate vessel for the bisphenol diester preparation as well as separation of the bisphenol diester from the esterification reaction medium, the two-reaction method affords better control of the bisphenol diester purity. In addition, the overall reaction time of the two-reaction method is shorter.

The halogenated aromatic polyesters prepared by the process of the present invention may be dissolved in a suitable spinning or casting solvent, such as methylene chloride, and formed into a shaped article, such as fiber, filament or film. As mentioned, polymers having an inherent viscosity (I.V.), as measured in a solution of a 50–50

(by weight) mixture of phenol and tetrachloroethane, of at least about 0.2 and often 0.3 or more can be obtained by the present invention. As also noted above, an I.V. of at least about 0.2 is usually necessary for utilization of the aromatic polyester in a commercial solvent-forming process.

The resulting halogenated aromatic polyester filamentary materials have substantial heat stability and light stability, are non-burning and are suitable for use in clothing.

The invention is additionally illustrated in connection with the following Examples, which are to be considered as illustrative of the present invention. It should be understood, however, that the invention is not limited to the specific details of the Examples.

Unless otherwise indicated, all percentages or proportions of materials mentioned in the specification and appended claims are by weight.

EXAMPLE I 45 g. of the diacetate of 4,4'-isopropylidene bis(2,6-dichlorophenol), 11.6 g. of isophthalic acid, 5 g. of terephthalic acid and 0.25 g. of cobalt acetate are dissolved in 100 ml. of diphenyl ether (b.p. 259° C.) and heated to 250° C. for 2 hours under a nitrogen atmosphere. The temperature of the reaction mixture is then increased to 270° C. and the diphenyl ether solvent is slowly distilled off at that temperature over three hours yielding a solid white polymer having an I.V. of 0.2 as measured at 25° C. in a solution of a mixture of phenol and tetrachloroethane.

EXAMPLE II

The procedure of Example I is repeated except that the cobalt acetate catalyst is present in an amount of 0.5 g. and the reaction is conducted by first heating the reaction mixture at 240° C. for 2 hours followed by heating for 5 hours at 260° C. The resulting polymer has an I.V. of 0.3.

EXAMPLE III

Example I is repeated except that 0.2 g. of manganese acetate is used as the catalyst and the reaction is conducted by first heating the reaction mixture to 240° C. for 2 hours followed by heating at 260° C. for 5 hours. The resulting polymer has an I.V. of 0.3.

EXAMPLE IV 45 g. of the diacetate of 4,4'-isopropylidene bis(2,6-dichlorophenol), 11.6 g. of isophthalic acid, 5 g. of terephthalic acid and 0.10 g. of cobalt acetate are dissolved in 100 ml. of diphenyl ether (b.p. 259° C.) and heated to a reaction temperature of 260° C. for 9 hours under a nitrogen atmosphere. The resulting polymer has an I.V. of 0.2.

EXAMPLE V

Example IV is repeated except that nickel acetate (0.5 g.) is used as the catalyst. The resulting polymer has an I.V. of 0.5.

EXAMPLE VI

The diacetate of 4,4'-isopropylidene bis(2,6-dichlorophenol) starting reactant is formed by dissolving 4,4'-isopropylidene bis (2,6-dichlorophenol) and acetic anhydride in a molar ratio of 0.49:1 in diphenyl ether solvent, adding a minor amount of sulfuric acid catalyst and heating the esterification reaction mixture to 80° C. for 3 hours.

The diacetate of 4,4'-isopropylidene bis(2,6-dichlorophenol) is separated from the esterification reaction mixture and 45 g. thereof is dissolved in 100 ml. of diphenyl ether together with 11.6 g. of isophthalic acid, 5 g. of terephthalic acid and 0.25 g. of cobalt acetate catalyst. This mixture is heated to a reaction temperature of 300° C. for 9 hours under a nitrogen atmosphere. The resulting polymer has an I.V. of 0.4.

EXAMPLE VII 90 g. of 4,4'-isopropylidene bis(2,6-dichlorophenol) diacetate, 23 g. of isophthalic acid, 10 g. of terephthalic acid and 0.001 g. of cobalt butyrate are dissolved in 100 ml. of diphenyl ether. The reaction mixture is heated to a reaction temperature of 250° C. for 2 hours. The reaction mixture temperature is then increased to 260° C. for 6 hours. The resulting polymer has an I.V. of 0.4.

EXAMPLE VIII

Example VII is repeated except that 0.01 g. of magnesium acetate is used as the catalyst. The resulting polymer has an I.V. of 0.5.

EXAMPLES IX-XII

The procedure of Example I is repeated utilizing the diacetates of 4,4'-isopropylidene bis(2-chlorophenol); 4,4'-isopropylidene bis(2,6 - dibromophenol); 4,4' - isopropylidene bis(2-bromophenol) and the dipropionate of 4,4'-isopropylidene bis(2,6-dichlorophenol), respectively. The resulting polymers have an I.V. of 0.6, 0.3, 0.6, and 0.4, respectively.

EXAMPLE XIII

Example I is repeated utilizing, however, the diacetate of the bisphenol:

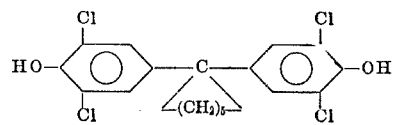

also known as 1,1-bis-(4-hydroxyl-2,6-dichlorophenyl)-cyclohexane. The resulting polymer has an I.V. of 0.3.

COMPARATIVE EXAMPLE A

Acid interchange reactions similar to those of the present invention are attempted using sodium acetate as the catalyst at varying reaction temperatures and in different solvents.

A reaction mixture of 45 parts by weight of 4,4'-isopropylidene bis(2,6-dichlorophenol) diacetate, 12.6 parts by weight isophthalic acid, 4.7 parts by weight terephthalic acid and 0.05 parts by weight sodium acetate is dissolved in tetrachloroethane solvent and heated to 160° C. for 7 hours under a nitrogen atmosphere. The solvent is distilled off. The resulting polymer has an I.V. below 0.15.

The above reaction mixture is dissolved in dichlorobenzene solvent and heated to a reaction temperature of 230° C. under a nitrogen atmosphere. The resulting polymer has an I.V. less than 0.15.

The above reaction mixture is dissolved in diphenyl ether solvent and heated to a reaction temperature of 290° C. under a nitrogen atmosphere. The resulting polymer has satisfactory color but an I.V. of about 0.16.

These runs indicate that the acid interchange reaction catalyzed with sodium acetate, a known esterification catalyst, yields unsatisfactory products having an I.V. unsuitable for commercial solvent-forming procedures even when operated at relatively high reaction temperatures.

COMPARATIVE EXAMPLE B

Reaction mixtures of the reactants and amounts as in Comparative Example A including other catalyst materials as set forth below are dissolved in diphenyl ether solvent and reacted at a reaction temperature of about 250° C. Catalyst materials used include antimony oxide, zinc chloride, magnesium, magnesium oxide, magnesium acetate, calcium acetate, triphenyl phosphine, sulfuric acid, phosphoric acid, hydrochloric acid, borotrifluoride and trifluoromethyl sulfonic acid all of which yield unacceptable polymers, in that the polymers have low I.V. values, and in the case of the acid-catalyzed reactions, the resulting polymers are dark-colored.

These runs indicate that the acid interchange reaction catalyzed with a number of known esterification catalysts yields polymers having unsatisfactorily low I.V. values. In addition, polymers formed by acid-catalyzed reactions using acid catalysts such as sulfuric acid or phosphoric acid disclosed in the aforesaid U.S. Pat. 2,595,343 are also dark-colored.

The principles, preferred embodiments and modes of operation of the present invention have been described in the foregoing specification. The invention which is itended to be protected herein, however, is not to be construed as limited to the particular forms disclosed, since these are to be regarded as illustrative rather than restrictive. Variations and changes may be made by those skilled in the art without departing from the spirit of the invention.

What is claimed is:

1. A process for producing a halogenated aromatic polyester which comprises reacting substantially stoichiometric amounts in solution while dissolved in a solvent which does not interfere with the reaction of
   (a) an aliphatic carboxylic acid ester of a monocarboxylic acid possessing 2 to 5 carbon atoms and a bisphenol having the recurring structural formula:

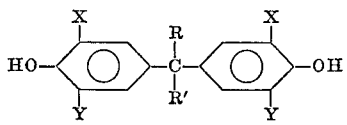

wherein X is chlorine or bromine and Y is hydrogen, chlorine or bromine, with the provision that when X is chlorine, Y is hydrogen or chlorine and when X is bromine, Y is hydrogen or bromine, R and R' may be the same or different and represent lower alkyl groups or may, together, constitute a cyclic hydrocarbon group with
   (b) an aromatic acid mixture of terephthalic and isophthalic acids wherein from about 10 to about 60 percent of the mixture is terephthalic acid and correspondingly from about 90 to about 40 percent of the mixture is isophthalic acid
   at a temperature of from about 220° C. to about 350° C. in the presence of a catalytically effective amount of a cobalt, nickel or manganese salt of an aliphatic carboxylic acid to yield the desired halogenated aromatic polyester.

2. The process of claim 1 wherein X and Y are chlorine.

3. The process of claim 2 wherein the aliphatic carboxylic acid ester is an acetic acid diester of the bisphenol.

4. The process of claim 3 wherein the said aromatic acid mixture contains from about 20 to about 40 percent of the mixture of terephthalic acid and correspondingly from about 80 to about 60 percent of the mixture of isophthalic acid, and wherein the catalyst is a salt of acetic acid.

5. The process of claim 4 wherein the solvent is diphenyl ether, and wherein the said catalyst is present in an amount of from 0.0001 to about 2 percent by weight of the total of the bisphenol diester and the aromatic acid mixture reactants.

6. The process of claim 1 wherein X and Y are bromine, the aliphatic carboxylic acid ester is an acetic acid diester of the bisphenol, the said aromatic acid mixture contains from about 20 to about 40 percent of the mixture of terephthalic acid and correspondingly from about 80 to about 60 percent of the mixture of isophthalic acid, the catalyst is a salt of acetic acid present in an amount of from 0.0001 to about 2 percent by weight of the total of the bisphenol diester and the aromatic acid mixture reactants, and the solvent is diphenyl ether.

7. A process for forming a halogenated aromatic polyester which comprises reacting substantially stoichiometric amounts in solution while dissolved in a solvent which does not interfere with the reaction of
   (a) a lower aliphatic carboxylic acid diester of a monocarboxylic acid possessing 2 to 5 carbon atoms and a bisphenol having the recurring structural formula:

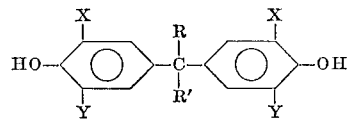

wherein X is chlorine or bromine and Y is hydrogen, chlorine or bromine, with the provision that when X is chlorine, Y is hydrogen or chlorine and when X is bromine, Y is hydrogen or bromine, R and R' are lower alkyl groups with
   (b) an aromatic acid mixture of terephthalic and isophthalic acids wherein from about 10 to about 60 percent of the mixture is terephthalic acid and correspondingly from about 90 to about 40 percent of the mixture is isophthalic acid
   at a temperature of from about 240° C. to about 320° C. in the presence of a catalytically effective amount of cobalt, nickel or manganese salt of an aliphatic carboxylic acid to yield the desired halogenated aromatic polyester.

8. The process of claim 7 wherein X and Y are chlorine, R and R' are methyl and the lower aliphatic carboxylic acid diester of the bisphenol is an acetic acid diester.

9. The process of claim 8 wherein the catalyst is a salt of acetic acid present in an amount of from 0.0001 to about 2 percent by weight of the total of the bisphenol diester and the aromatic acid mixture reactants.

10. The process of claim 9 wherein the solvent is diphenyl ether and the said aromatic acid mixture contains from about 20 to about 40 percent of the mixture of terephthalic acid and correspondingly from about 80 to about 60 percent of the mixture of isophthalic acid.

11. A process for forming a halogenated aromatic polyester which comprises:
   (a) reacting acetic anhydride with a bisphenol having the structural formula:

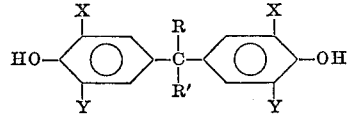

wherein X is halogen, Y is hydrogen or halogen with the provision that the halogens of X and Y are always the same, R and R' are the same or different and represent lower alkyl groups or hydrogen or may, together, constitute a cyclic hydrocarbon group, in the presence of molar amounts of from about 1:2 to about 1:10 of said bisphenol to acetic anhydride and a catalytically effective amount of an esterification catalyst to produce the diacetate of the said bisphenol; and
   (b) reacting a substantially stoichiometric amount of said diacetate with an aromatic acid mixture of from about 10 to about 60 percent of the mixture of terephthalic acid and, correspondingly, from about 40 to about 90 percent of the mixture of isophthalic acid in an organic solvent which does not interfere with the reaction at a temperature of from about 220° C. to about 350° C. in the presence of a catalytically effective amount of cobalt, nickel or manganese salt of an aliphatic carboxylic acid to yield the desired halogenated aromatic polyester.

12. The process of claim 11 wherein X and Y are chlorine, R and R' are methyl.

13. The process of claim 12 wherein the said aromatic acid mixture contains from about 20 to about 40 percent of the mixture of terephthalic acid and correspondingly from about 80 to about 60 percent of the mixture of isophthalic acid.

14. The process of claim 13 wherein the said catalyst is a cobalt, nickel or manganese salt of acetic acid, and wherein said organic solvent in step (b) is diphenyl ether.

15. The process of claim 14 wherein the reaction of step (b) is performed at a temperature of from about 240° C. to about 320° C. and the bisphenol is 4,4'-isopropylidene bis(2,6-dichlorophenol).

References Cited

UNITED STATES PATENTS

| | | | |
|---|---|---|---|
| 3,704,279 | 11/1972 | Ismail | 260—61 |
| 3,317,464 | 5/1967 | Conix | 260—47 |
| 3,234,167 | 2/1966 | Sweeny | 260—30 A |
| 3,449,295 | 6/1969 | Conix | 260—47 |

LESTER L. LEE, Primary Examiner

U.S. Cl. X.R.

260—33.4 P, 3.38 R, 61, Dig. 24